United States Patent
Tsai et al.

(10) Patent No.: US 7,532,265 B2
(45) Date of Patent: May 12, 2009

(54) INTEGRATED CIRCUIT WITH THE CELL TEST FUNCTION FOR THE ELECTROSTATIC DISCHARGE PROTECTION

(75) Inventors: Ja-Fu Tsai, Chiayi County (TW); Wen-Chun Wang, Taichung (TW)

(73) Assignee: Wintek Corporation, Taichung (TW)

( * ) Notice: Subject to any disclaimer, the term of this patent is extended or adjusted under 35 U.S.C. 154(b) by 609 days.

(21) Appl. No.: 11/147,426

(22) Filed: Jun. 8, 2005

(65) Prior Publication Data
US 2006/0279667 A1 Dec. 14, 2006

(51) Int. Cl.
*G02F 1/1333* (2006.01)
*G02F 1/1343* (2006.01)
*G02F 1/13* (2006.01)
*G02F 1/1335* (2006.01)

(52) U.S. Cl. .............. 349/40; 349/54; 349/55; 349/192; 349/139; 349/103; 257/59; 257/443; 324/770

(58) Field of Classification Search ............. 349/40, 349/54, 55, 192, 139, 103; 257/59, 443; 324/770
See application file for complete search history.

(56) References Cited

U.S. PATENT DOCUMENTS

| | | | | |
|---|---|---|---|---|
| 6,493,047 | B2 * | 12/2002 | Ha ............................... | 349/40 |
| 2004/0222813 | A1 * | 11/2004 | Kim et al. .................... | 324/770 |
| 2005/0285984 | A1 * | 12/2005 | Tsai et al. ..................... | 349/40 |

* cited by examiner

*Primary Examiner*—Julie Ngo
(74) *Attorney, Agent, or Firm*—Muncy, Geissler, Olds & Lowe, PLLC

(57) ABSTRACT

An integrated circuit with the cell test function for the electrostatic discharge (ESD) protection, wherein each ESD unit protection circuit has a first, second, and third thin film transistors (TFTs) composed and connected to a signal line, a fourth TFT's and a fifth TFT's gate and drain electrodes are also shorted at the common electrode and the source electrode of the third TFT connects to the common electrode. A sixth TFT's drain electrode connects to the source electrode of the fourth TFT and the source electrode of the fifth TFT connects to the gate electrode of the sixth TFT. By the gate and drain electrodes of the sixth TFT connecting to the corresponding test-switch pads respectively, the sixth TFT is used as a TFT switch so as to build the cell test function in the ESD unit protection circuit.

11 Claims, 5 Drawing Sheets

INTEGRATED CIRCUIT WITH THE CELL TEST FUNCTION FOR THE ELECTROSTATIC DISCHARGE PROTECTION

FIELD OF THE INVETNION

The present invention relates to an integrated circuit with the cell test function for the electrostatic discharge (ESD) protection. The ESD protection unit circuit includes a circuit with the cell test function, which is a protection circuit for the electrostatic discharge when the circuit is not used to measure panel.

BACKGROUND OF THE INVENTION

The thin film transistor liquid crystal display (TFT-LCD) is a well-developed product now. However, because a thin film transistor (TFT) device is produced on a glass-insulated panel, the related ESD problems occur during the manufacturing process of the panel. Once there is a transistor or more devices of the active matrix in the panel damaged by the ESD, it will result in a point defect or a line defect on the display area of the panel. Therefore, the panel is classified imperfect product and degrades the yield rate seriously.

During the mass-production processes of TFTs (array, cell, and module process), the ESD occurs very easily. The electrostatic discharge causes the insulated layer of the matrix-array TFT's gate electrode to be broken and very large leakage current. Accordingly, the occurrence of the electrostatic discharge affects the yield rate of a product very much. The design of electrostatic discharge protection can protect the devices of active matrix from the ESD due to external causes such as human or equipments so as to promote the effect of protection for transistor devices and achieve better ESD protection.

As shown in FIG. 1, the well-known design for electrostatic discharge protection uses two transistors in a diode style by reversed connection to form the ESD protection unit 10. Each signal line 12 (scan line or data line) connects to the protection unit 10 such that the signal line 12 is protected. In the circuit, one end of the transistor T11 connects to the IC pad, the signal line 12, and the the transistor's T21 source electrode; the other end of the transistor T11 connects to the common electrode 13 and the drain's transistor T21 source electrode. The discharge paths for electrostatic discharge are that the transistor T11 is the device for discharging positive electrostatic discharge, and the transistor T21 is the device for discharging negative electrostatic discharge. Although the protection unit 10 can achieve the effect of electrostatic discharge protection, the effectiveness is not satisfactory because only one ESD protection unit 10 provides discharge paths for each signal line 12.

Regarding the manufacturing process of TFTs, the cell test function process is a very important step of testing panels. It can help to find fail panels; the cell test function design of testing panel can avoid the unnecessary cost for module assembly in the later stage. For the time being, there are two major methods for the cell test function. The first one is the shorting bar method: connecting all scan lines to data lines respectively by shorting bars, and then conducting a voltage to perform panel testing. However, once the cell test process is completed, the shorting bars connected between scan lines and data lines have to be cut by a laser cut machine so as to let the scan lines be independent to each other. The data lines are independent to each other, too.

The second one is the TFT switch method. Please refer to FIG. 2, outside the matrix area 20 that is used to set the display pixel, a TFT switch element 22 is set between each scan line and data line, and then connects to the display matrix area 20. Connecting the gate electrode of each TFT switch element 22 is going to input a voltage signal to the test-switch pad PDSA. Besides, the drain electrode of each TFT switch element 22 connects to the corresponding test pads PSE, PSO, PDR, PDG, and PDB, which are distinguished by odd, even, R, G, and B. The source electrode of each TFT switch element 22 connects to the scan line and the data line, and then inputs to the display matrix area 20. As long as a display voltage is applied to test pads PSE, PSO, PDR, PDG, PDB, and the common electrode (Vcom), together with a voltage is applied to the test-switch pad PDSA so as to let the TFT switch element 22 be "ON", the cell test function can be achieved. Although this method does not like the first method that needs a laser machine to cut, the electrostatic discharge protection circuit has to be extra manufactured to achieve the effect of ESD protection.

SUMMARY OF THE INVENTION

Consequently, for solving the above-mentioned problems, the main purpose of the current invention is to propose an integrated circuit for the electrostatic discharge protection and the cell test function; one of the transistors in the ESD protection unit of the protection circuit is used as a thin film transistor (TFT) switch for the cell test function, and the cell test function is constructed in the original ESD protection unit circuit, it is not necessary to add the extra ESD protection circuit or TFT switches. As a result, the ESD protection unit circuit of the current invention has the cell test function, and the circuit is an electrostatic discharge protection circuit when the circuit does not measure panel.

Another purpose of the current invention is to achieve a better electrostatic discharge protection effect by connecting each ESD protection unit to the ESD protection units of the scan lines or the data lines that forms a parallel configuration. By way of this design, each ESD protection unit can promote the endurance ability of the ESD protection of the corresponding signal line.

The present invention has the third purpose. The TFT switch of the cell test function has been included in each ESD protection unit, so the non-destructive laser-cutting process can be increased. However, the present invention does not like the well-known method that uses shorting bars, and an extra laser-cutting process is needed after the cell test is completed. The present invention efficiently saves the cost of equipments.

The present invention is an integrated circuit with the cell test function and the electrode static discharge (ESD) protection, which can test the panels fail or normal display and protect the electrostatic discharge for a TFT liquid crystal display. The circuit is located at the surroundings of the active area of the display panel, and each signal line of the scan line and data line has an ESD protection unit. Each ESD protection unit circuit includes:

A first TFT's gate and drain electrodes are short and a second TFT's gate and drain electrodes are also short with the first TFT's gate and drain electrodes to a signal line; the node of a third TFT's gate electrode connecting to the first TFT's source electrode connects to the node of the third TFT's gate electrode connecting to the first TFT's source electrode of the ESD protection unit of the neighbor other stages signal lines (scan lines or data lines); the node of the third TFT's drain electrode connecting to the second TFT's source electrode connects to the node of the second TFT's source electrode connecting to the third TFT's drain electrode of the ESD protection unit of the neighbor other stages signal lines.

A fourth TFT's gate and drain electrodes are short, and a fifth TFT's gate and drain electrodes are also short with the fourth TFT's gate and drain electrodes to the common electrode; the node of a sixth TFT's drain electrode connecting to the fourth TFT's source electrode connects to the node of the sixth TFT's drain electrode connecting to the fourth TFT's source electrode of the ESD protection unit of the neighbor other stages signal line (scan lines or data lines). The sixth TFT's drain electrode connects to a test pad that connects to all the sixth TFTs' drain electrodes, and the test pad can be inputted signal pulse. Besides, the sixth TFT's source electrode connects to the signal line.

The node of the fifth TFT's source electrode connecting to the sixth TFT's gate electrode connects to the node of the fifth TFT's source electrode connecting to the sixth TFT's gate electrode of the ESD protection unit of the neighbor other stages signal lines (scan lines or data lines). The sixth TFT's gate electrode connects to a test-switch pad that connects to the sixth TFT's gate electrode of all scan or data signal lines of the display panel.

BRIEF DESCRIPTION FOR THE DRAWINGS

DETAILED DESCRIPTION OF THE PREFERRED EMBODIMENTS

The detailed descriptions for content and technology of this invention associated with figures are as follows.

Figure 1:
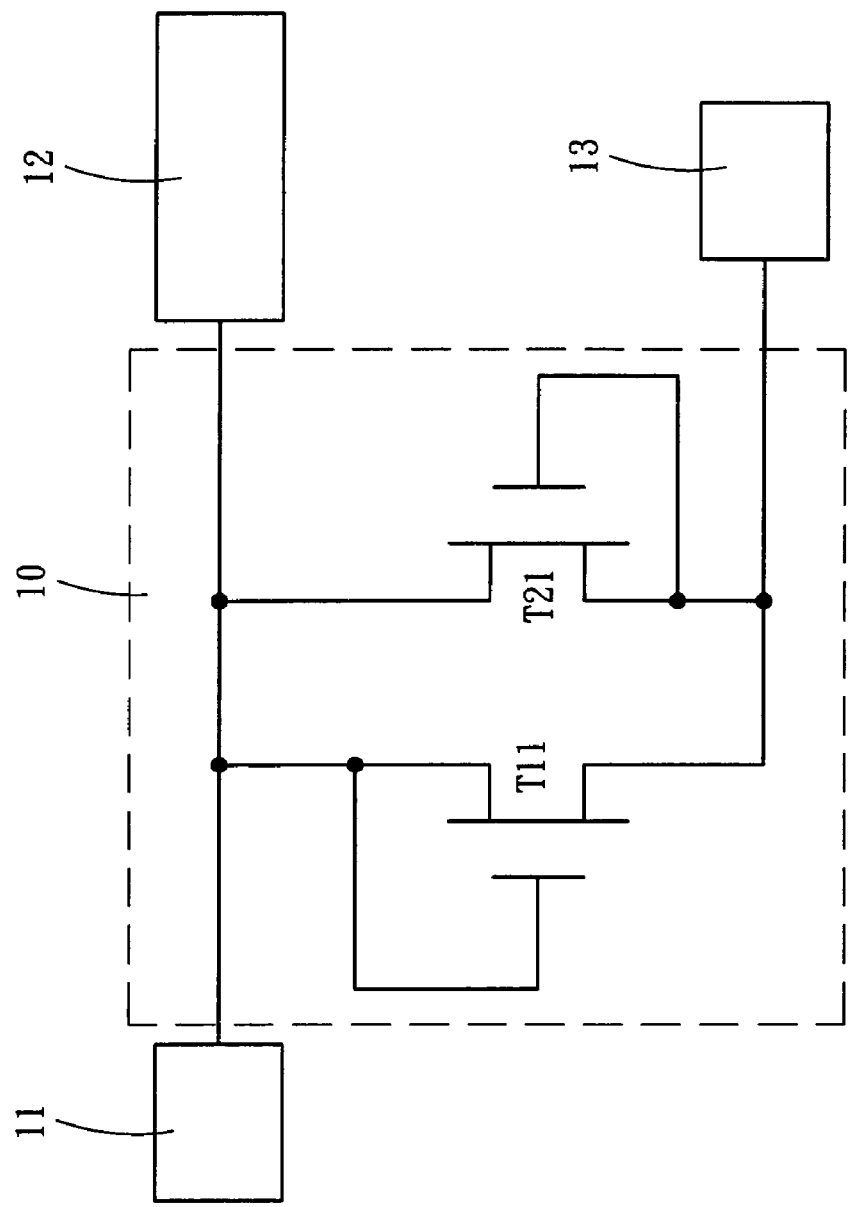
FIG. 1 is a schematic diagram for the well-known ESD protection unit circuit.
Figure 2:
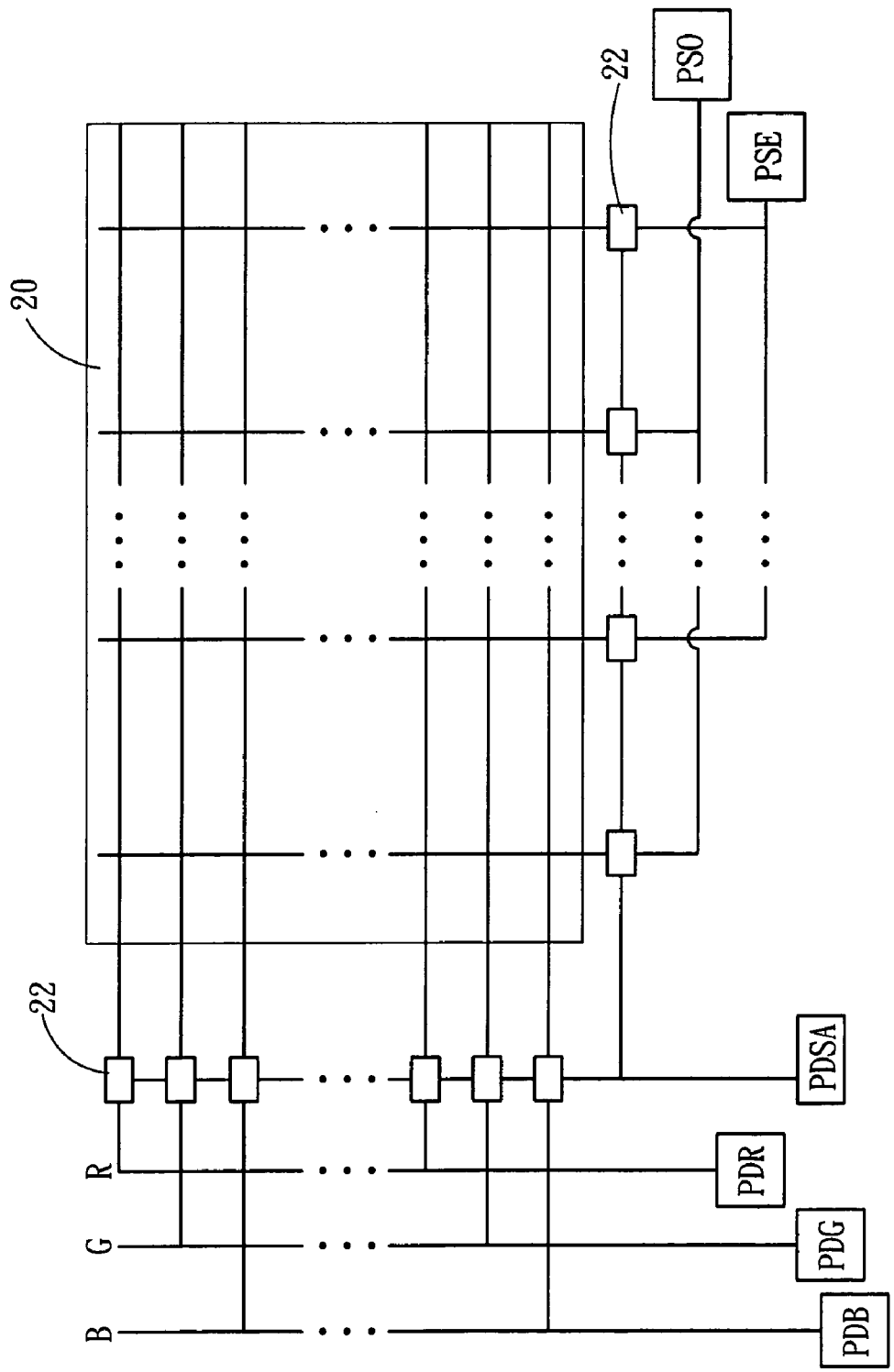
FIG. 2 is a schematic diagram for the well-known display panel with a TFT switch.
Figure 3:
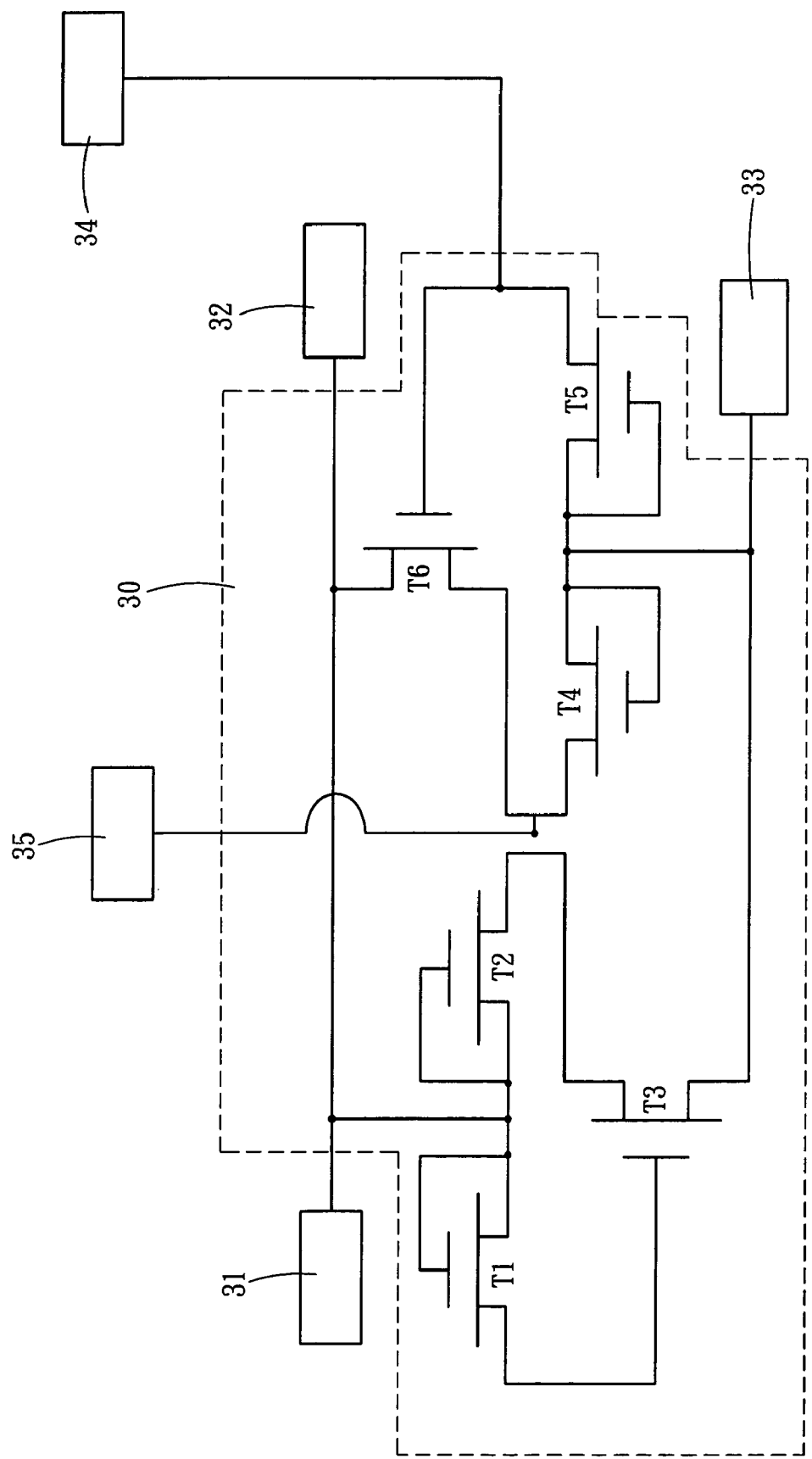
FIG. 3 is a schematic diagram for the ESD protection unit circuit of the current invention.
Figure 4:
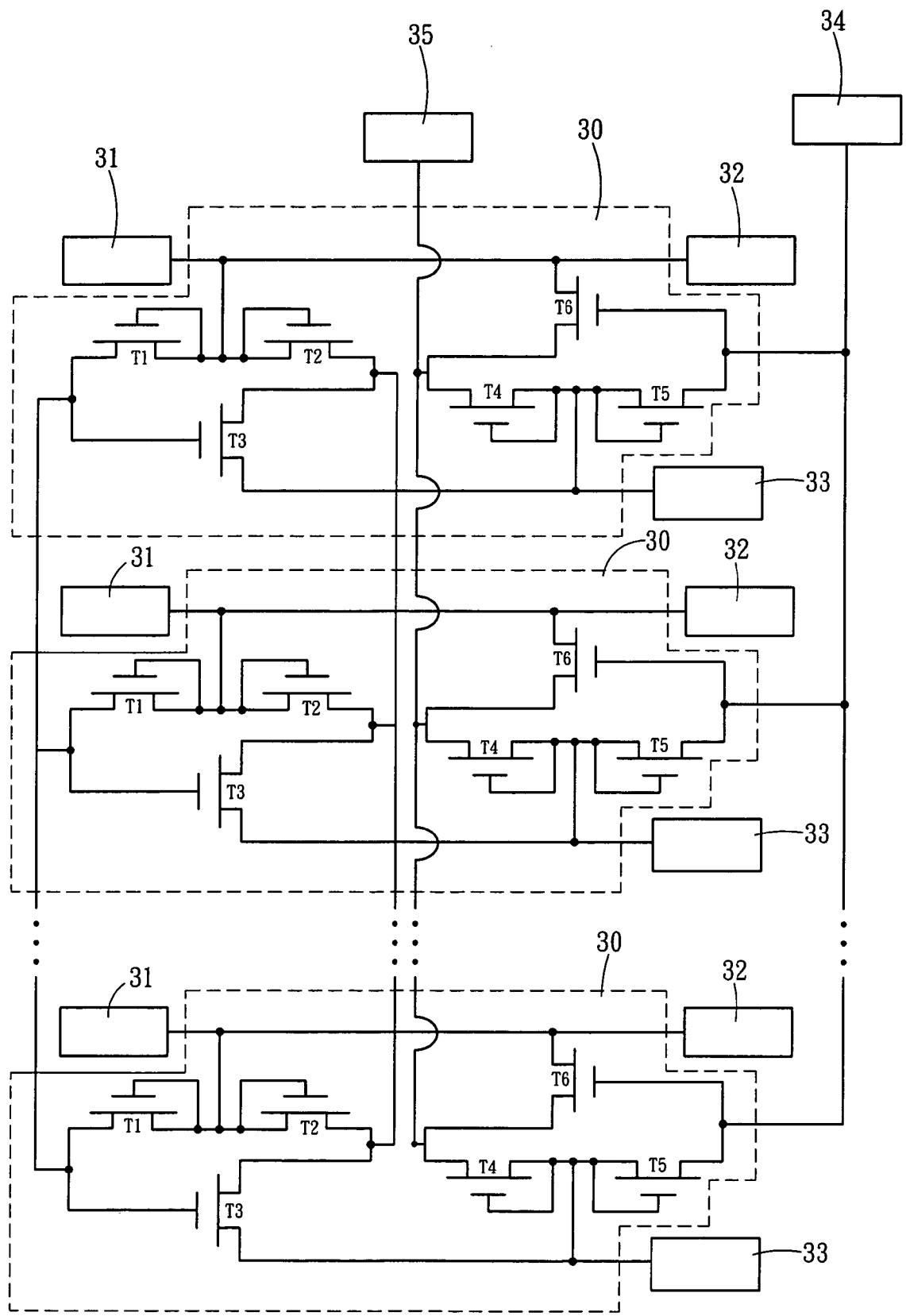
FIG. 4 is a schematic diagram for the neighbor ESD protection unit circuit of the current invention.
Figure 5:
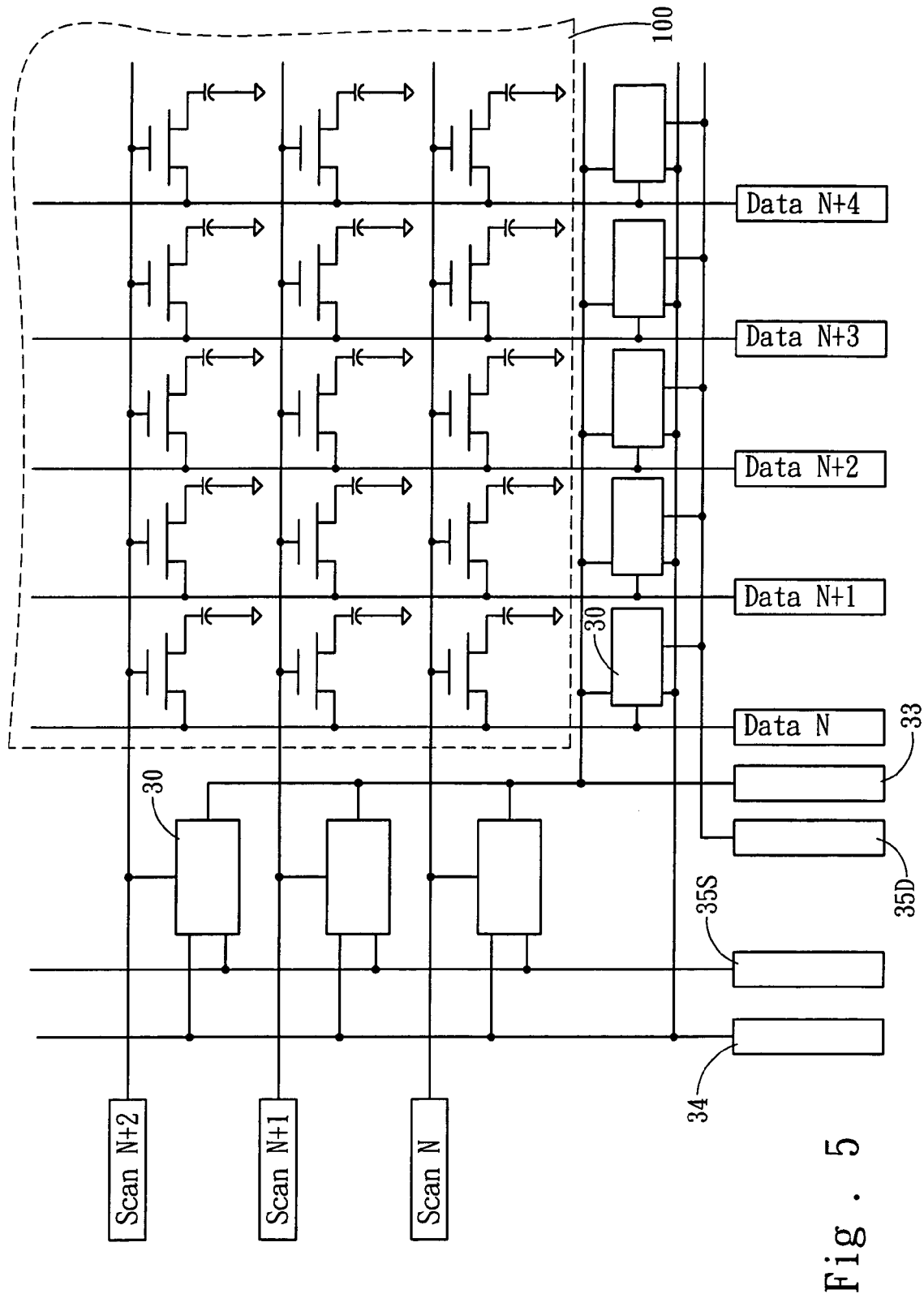
FIG. 5 is a schematic allocation diagram for the single display panel of the current invention.

Please refer to FIGS. 3, 4 and 5, which are the schematic diagrams for the ESD protection unit circuit, the schematic diagram for the neighbor other stages ESD protection unit circuit, and the schematic allocation diagram for the single display panel of the current invention, respectively. The present invention is an integrated circuit with the cell test function and the electrode static discharge (ESD) protection, which can test the panels fail or normal display and protect the electrostatic discharge for a thin film transistor liquid crystal display. The circuit is located at the surroundings of an active area 100 of the display panel, and each signal line 32 of the scan lines and data lines has an ESD protection unit 30. Each ESD protection unit of the signal line is connected to each other in parallel and the ESD protection unit 30 circuit includes:

A first TFT's T1 gate and drain electrodes are short, and a second TFT's T2 gate and drain electrodes are also shorted with the first TFT's T1 gate and drain electrodes to a signal line 32 and an IC pad 31 (the IC pad 31 is the Scan N, Scan N+1, Scan N+2, Data N, Data N+1, Data N+2 in FIG. 5); the node of a third TFT's T3 gate electrode connecting to the first TFT's T1 source electrode connects to the node of the third TFT's T3 gate electrode connecting to the first TFT's T1 source electrode of the ESD protection unit 30 of the neighbor other stages scan lines or data lines. The node of the third TFT's T3 drain electrode connecting to the second TFT's T2 source electrode connects to the node of the third TFT's T3 drain electrode connecting to the second TFT's T2 source electrode of the ESD protection unit 30 of the neighbor other stages signal line 32 (scan lines or data lines). Consequently, the second TFT's T2 source electrode and the third TFT's T3 drain electrode of the ESD protection unit 30 of the neighbor other stages signal line 32 (scan lines or data lines) are connected. Besides, the third TFT's T3 source electrode connects to a common electrode 33.

A fourth TFT's T4 gate and drain electrodes are short, and a fifth TFT's T5 gate and drain electrodes are also short with the fourth TFT's T4 gate and drain electrodes to the common electrode 33; the node of a sixth TFT's T6 drain electrode connecting to the fourth TFT's T4 source electrode connects to the node of the sixth TFT's T6 drain electrode connecting to the fourth TFT's T4 source electrode of the ESD protection unit 30 of the neighbor other stages signal line 32 (scan lines or data lines).The sixth TFT's T6 drain electrode connects to a test pad 35, and the test pad 35 can be further divided into a scan-test pad 35S and a data-test pad 35D, which respectively connects to the sixth TFT's T6 the drain electrode of all signal lines 32 (scan lines or data lines). The sixth TFT's T6 source electrode of each ESD protection unit 30 connects to the corresponding signal line 32 (scan lines or data lines). The scan-test pad 35S can be further divided into even and odd according to scan lines. The data-test pad 35D can be further divided into even and odd or among R, G, and B according to data lines.

The node of fifth TFT's T5 source electrode connecting to the sixth TFT's T6 gate electrode connects to the node of the fifth TFT's T5 source electrode connecting to the sixth TFT's T6 gate electrode of the ESD protection unit 30 of the neighbor other stages signal line 32 (scan lines or data lines). The sixth TFT's T6 gate electrode connects to the test-switch pad 34 that connects to the sixth TFT's T6 gate electrode of all scan or data signal lines 32 of the display panel.

The actions for the cell test function or the electrostatic discharge protection done by the ESD protection unit 30 integrated circuit of this invention are described as follows:

1. When the ESD protection unit 30 integrated circuit of this invention is performing the cell function test, a voltage level is added to the test-switch pad 34 for turning on the sixth TFT T6; a scanning voltage level is added to the scan-test pad 35S; a data voltage level is added to the data-test pad 35D; and a DC or AC level is added to the common electrode 33. For example, a 25V can be added to the test-switch pad 34; a suitable voltage level (a 15V is added to the scan-test pad 35S, a 4V is added to the data-test pad 35D) is added to the test pad 35; a 0V can be added to the common electrode. At this time, the fourth and the fifth TFTs T4 and T5 are "OFF", and the sixth TFT T6 is "ON" (the first, second, and third TFTs T1, T2 and T3 are "ON" at this moment). It is known according to the afore-mentioned description that the node of the fourth TFT's T4 source electrode connecting to the sixth TFT's T6 drain electrode connects to the node of the sixth TFT's T6 drain electrode connecting to the fourth TFT's T4 source electrode of the ESD protection unit 30 of all neighbor other stages scan lines or data lines. By way of the sixth TFT T6 of the ESD protection unit 30 of each stage, the voltage of the test pad 35 (the scan-test pad 35S and the data-test pad 35D) passes to the signal line 32 (scan lines and data lines) such that the signal line 32 of the display panel inputs the necessary working voltage to the active area 100 for displaying pixels.

2. When the ESD protection unit 30 integrated circuit of this invention is performing the electrostatic discharge protection, if the signal line 32 (scan lines and data lines) generates positive static electricity, and the first, second, and third TFTs T1, T2, and T3 are "ON", the positive electrostatic discharge will be discharged through the ESD protection unit 30 of the signal line 32. The scan line or data line is at the high-level state, so the first and the second TFTs T1 and T2 are turned on. At this time, the first and second TFTs' T1 and T2 source electrodes are at the high-level state, the corresponding the third TFT T3 can be turned on such that the positive electrostatic discharge will be discharged to the common electrode 33 through the third TFT T3 of the signal line 32 (scan lines and data lines). Moreover, the ESD protection unit 30 of all other stages signal lines 32 (scan lines and data lines), it is known according to the afore-mentioned description that the positive electrostatic can be discharged can not only through the third TFT T3 of the signal line 32 but also through the third TFT T3 of the ESD protection unit 30 of the neighbor other stages signal lines 32 (scan lines and data lines), which forms a multi-path to discharge the positive electrostatic discharge. On the other hand, the negative electrostatic discharge is discharged in a similar principle. By way of this design, the effectiveness of electrostatic discharge protection can be promoted so as to promote the production yield rate of panels. Furthermore, the design of electrostatic discharge protection will affect neither the cell test function nor the module driving for normal display of the product module.

To sum up, the merits of the integrated circuit with the cell test function and the electrode static discharge (ESD) protection of this invention are using one of the transistors in the ESD protection unit 30 circuit as a TFT switch, and the TFT switch has the cell test function such that the ESD protection unit 30 circuit of the current invention has the cell test function, and the circuit is an electrostatic discharge protection circuit when the circuit does not measure panel. The parallel configuration of the ESD protection unit 30 achieves a better electrostatic discharge protection effect. By way of this design, each ESD protection unit 30 can promote the endurance ability of the electrostatic discharge protection of the corresponding signal line.

Because the TFT switch has been included in each ESD protection unit 30, the non-destructive cell test function can be increased. However, the present invention does not like the well-known method that uses shorting bars, and an extra laser-cutting process is needed after the cell test is completed. The present invention efficiently saves the cost for equipments.

However, the above description is only a better practice example for the current invention, which is not used to limit the practice scope of the invention. All equivalent changes and modifications based on the claimed items of this invention are in the scope of the present invention.

What is claimed is:

1. An integrated circuit with the cell test function for the electrostatic discharge (ESD) protection which is used in the ESD protection circuit of a thin film transistor (TFT) liquid crystal display and locates at the surroundings of an active area of a display panel, comprising:
   an ESD protection unit installed on each signal line of a scan line and a data line, wherein the ESD protection unit of the signal line is connected to each other,
   wherein the circuit of the ESD protection unit includes:
   a first TFT's gate and drain electrodes are short, and a second TFT's gate and drain electrodes are also shorted with the first TFT's gate and drain electrodes to the signal line;
   a third TFT's gate electrode connects to the first TFT's source electrode, the third TFT's drain electrode connects to the second TFT's source electrode, and the third TFT's source electrode connects to a common electrode;
   a fourth TFT's gate and drain electrodes are short, and a fifth TFT's gate and drain electrodes are short with the fourth TFT's gate and drain electrodes of to the common electrode; and
   a sixth TFT's drain electrode connects to the fourth TFT's source electrode, the sixth TFTs drain electrode connects to a test pad, and the sixth TFT's source electrode connects to the signal line,
   wherein the fifth TFT's source electrode connects to the sixth TFT's gate electrode, and the sixth TFT's gate electrode connects to a test-switch pad.

2. The integrated circuit with the cell test function for the ESD protection of claim 1, wherein in the circuit of the ESD protection unit, the node of the first TFT's source electrode connecting to the third TFT's gate electrode connects to the node of the first TFT's source electrode and the third TFT's gate electrode of the neighbor ESD protection unit.

3. The integrated circuit with the cell test function for the ESD protection of claim 1, wherein in the circuit of the ESD protection unit, the node of the third TFT's drain electrode connecting to the second TFT's source electrode connects to the node of the second TET's source electrode and the third TFT's drain electrode of the neighbor ESD protection unit.

4. The integrated circuit with the cell test function for the ESD protection of claim 1, wherein in the circuit of the ESD protection unit, the node of the fourth TFT's source electrode connecting to the sixth TFT's drain electrode connects to the node of the sixth TFT's drain electrode and the fourth TFT's source electrode of the neighbor ESD protection unit.

5. The integrated circuit with the cell test function for the ESD protection of claim 1, wherein in the circuit of the ESD protection unit, the node of the sixth TFT's gate electrode connecting to the fifth TFT's source electrode and connects to the node of the fifth TFT's source electrode and the sixth TFT's gate electrode of the neighbor ESD protection unit.

6. The integrated circuit with the cell test function for the ESD protection of claim 1, wherein the test-switch pad connects to the gate electrodes of the sixth TFTs of all signal lines of the display panel.

7. The integrated circuit with the cell test function for the ESD protection of claim 1, wherein the test pad connects to the drain electrodes of the sixth TFT's installed on scan lines and data lines of signal lines.

8. The integrated circuit with the cell test function for the ESD protection of claim 7, wherein the test pad can be further divided into a scan-test pad and a data-test pad.

9. The integrated circuit with the cell test function for the ESD protection of claim 8, wherein the scan-test pad can be further divided into even and odd according to scan lines.

10. The integrated circuit with the cell test function for the ESD protection of claim 8, wherein the data-test pad can be further divided into even and odd.

11. The integrated circuit with the cell test function for the ESD protection of claim 8, wherein the data-test pad can be further divided into R, G, and B according to data lines.

* * * * *